July 20, 1943.  J. W. BRUNDAGE  2,324,818
PRESS
Filed May 29, 1941   3 Sheets-Sheet 1

INVENTOR.
JAMES W. BRUNDAGE
BY Oberlin, Limbach & Day.
ATTORNEYS

July 20, 1943.  J. W. BRUNDAGE  2,324,818
PRESS
Filed May 29, 1941  3 Sheets-Sheet 2
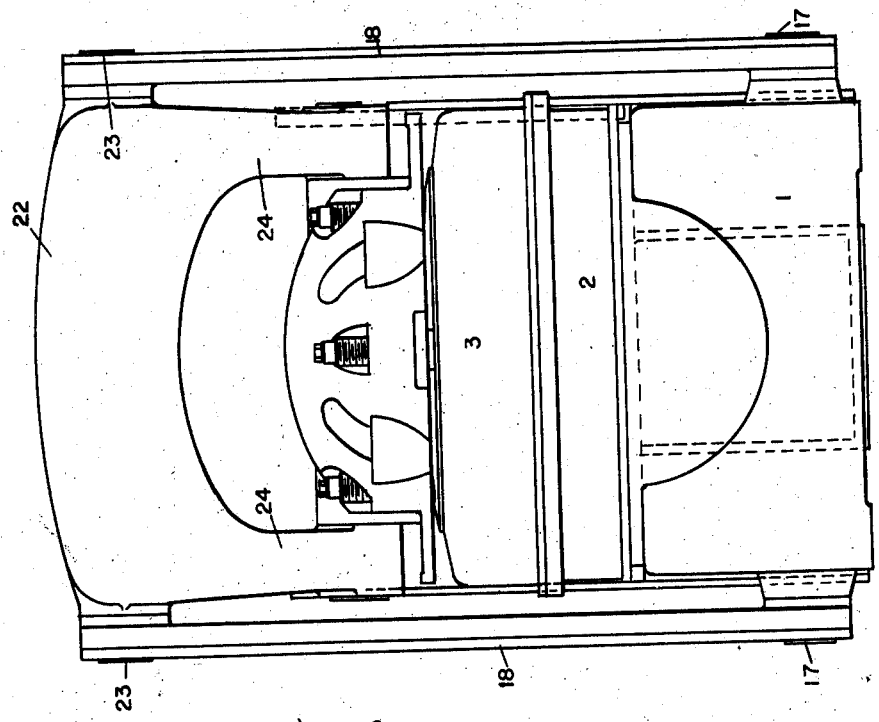
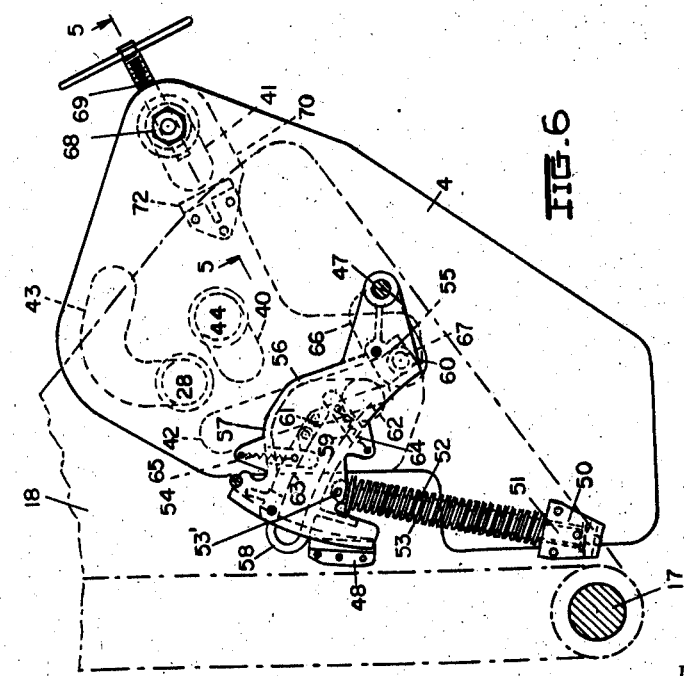
INVENTOR.
JAMES W. BRUNDAGE
BY Oberlin, Limbach & Day.
ATTORNEYS

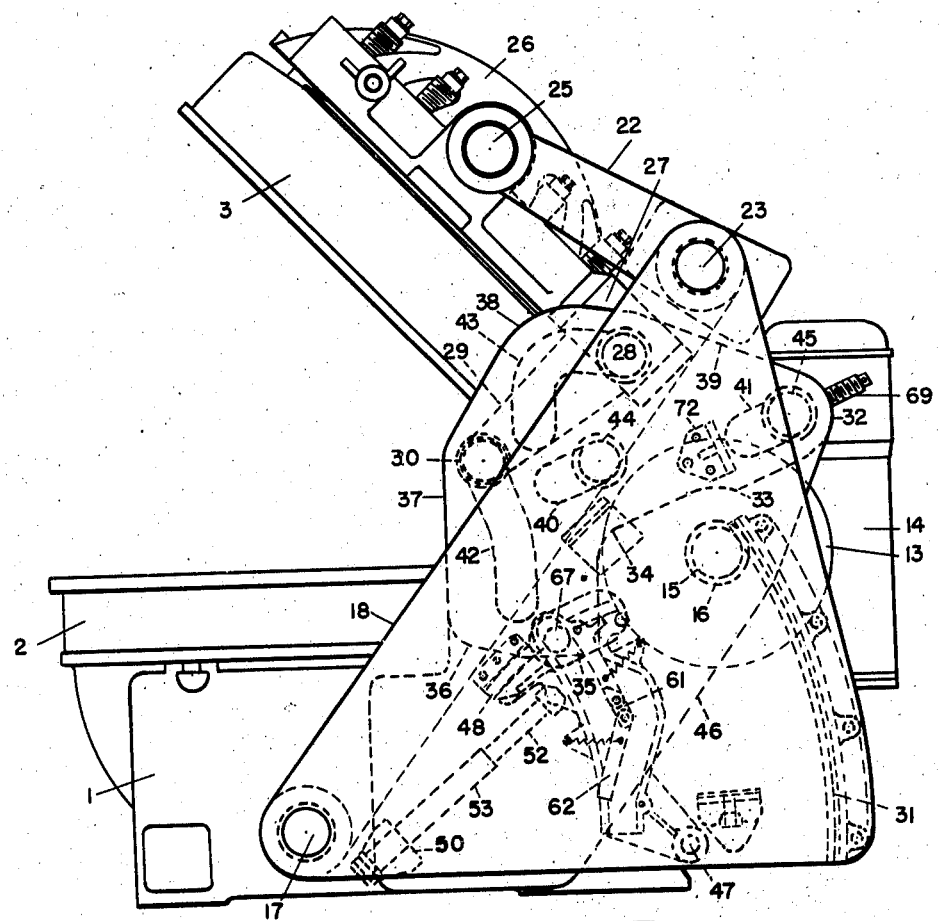
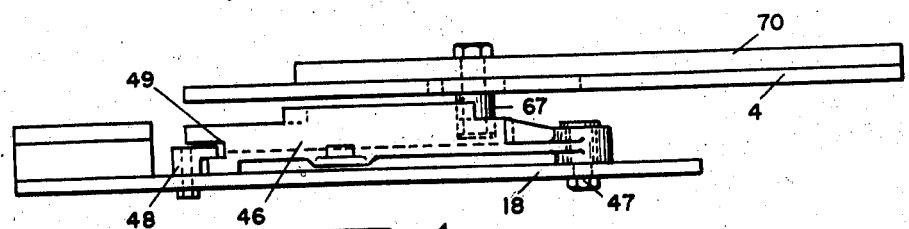

Patented July 20, 1943

2,324,818

UNITED STATES PATENT OFFICE 2,324,818

PRESS

James W. Brundage, Akron, Ohio, assignor to The Summit Mold & Machine Company, Akron, Ohio, a corporation of Ohio Application May 29, 1941, Serial No. 395,807

3 Claims. (Cl. 18—17)

This invention relates as indicated to a press, and more particularly to vulcanizer presses and especially to such vulcanizers as are adapted for the curing of pneumatic tire casings and the like.

In my prior applications, Serial No. 245,726 filed Dec. 14, 1938 and Serial No. 331,543 filed April 25, 1940, I have disclosed vulcanizer presses of the character to which this invention relates in that they are characterized by the fact that they include cooperating annular cavity members for embracing the upper and lower portions of a tire which has been vulcanized, and means for supporting and relatively moving said members to embrace the tire while such members are slightly separated, and additional means associated with said supporting means for relatively shifting said cavity members a substantial distance transversely of their axes while so embracing said tire in slightly separated positions to loosen said tire from a cavity.

In the operation of presses of this character, difficulty is encountered due to the fact that they are required to vulcanize tires of different size, and tires having different tread designs. The size of the tire and the particular configurations of its tread design all have an influence on the degree to which the cavity members should be relatively shifted transversely in order to properly effect a loosening of the tire from the cavity.

It is a principal object of the present invention to provide in a vulcanizer press of the character described means whereby the degree of such relative transverse shifting of the cavity members may be adjustably varied in order to adapt the vulcanizer press to its best mode of operation for the particular tire which it will be called upon to vulcanize.

Other objects of this invention will appear as the description proceeds.

To the accomplishment of the foregoing and related ends, said invention then comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

In said annexed drawings:

Fig. 2 is a front elevational view, that is, taken from the left-hand side of the press illustrated in Fig. 1;

Fig. 3 is a side elevational view of the press illustrated in Fig. 1 but showing the press in its open position;

Fig. 4 is a plan view of one of the side plate assemblies of the press illustrated in Figs. 1 to 3;

Figure 1:
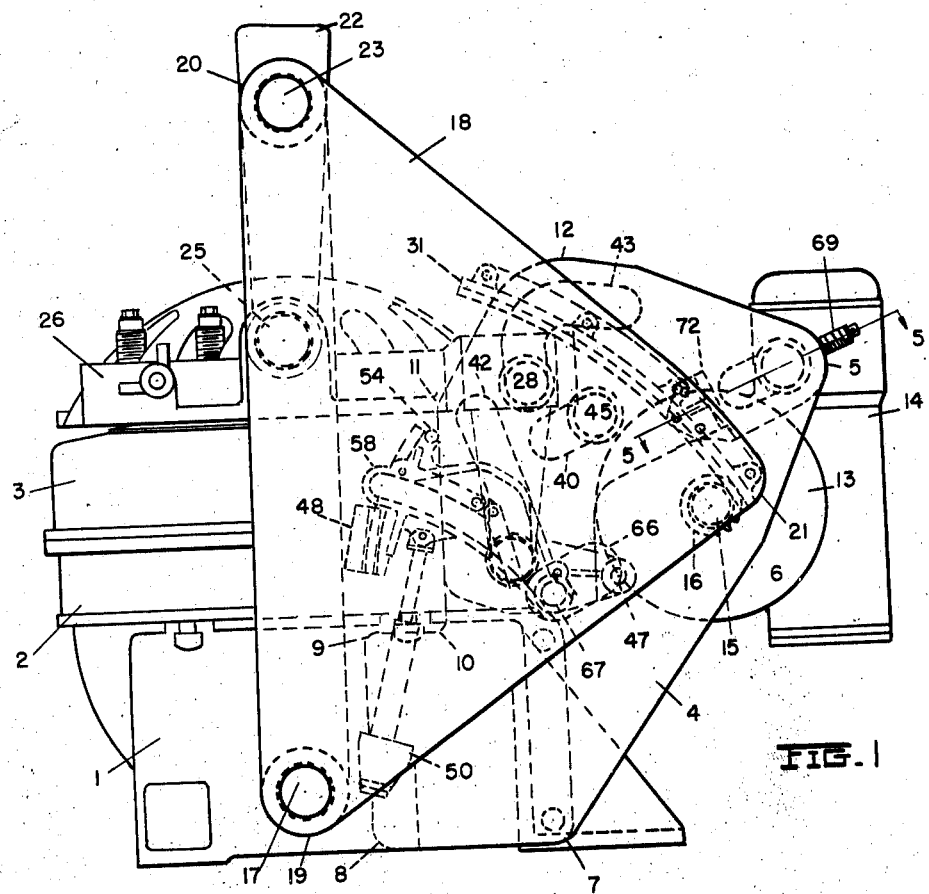
Fig. 1 is a side elevational view of a vulcanizer press embodying the principles of my invention, the press in this figure being shown in its closed position.
Figure 5:
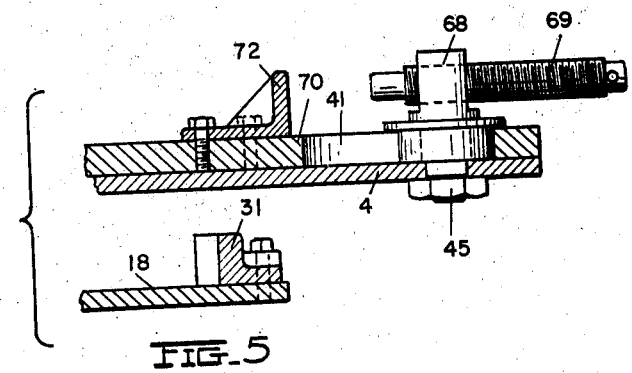

Fig. 5 is a fragmentary transverse sectional view of a portion of the press illustrated in Fig. 1 taken on a plane substantially indicated by the line 5—5; and Fig. 6 is a fragmentary side elevational view of one of the side plate assemblies of the press illustrated in Figs. 1 and 3. It will be observed that the plane on which Fig. 5 is taken is likewise indicated in Fig. 6 by the line 5—5.

Referring now more specifically to the drawings, and more especially to Figs. 1 to 3, the press here illustrated consists of a base 1, supporting a lower stationary mold section 2, which cooperates with a movable mold section 3 in defining therebetween a curing cavity in which the article, such as a tire casing, is to be vulcanized. The cavity defined by the mold sections 2 and 3 is annular in form, and the outer periphery of such annular cavity, that is the matrix faces of the mold sections 2 and 3, are provided with the conventional embossings which form the tread designed on the tire during its curing operation. Since the molds 2 and 3, in so far as their matrix faces are concerned, are thus conventional molds, the construction of which is well-known to those familiar with the art, it is believed unnecessary to more specifically illustrate or describe such matrix faces.

Rigidly mounted on the base 1 at opposite sides thereof are stationary side plates 4. In order to facilitate tracing the configuration of the side plates, it will be observed that the side plates shown in Fig. 1 extend through the following points: 5, 6, 7, 8, 9, 10, 11, 12 and back to 5. As indicated, two of these side plates 4 are provided, one on each side of the press, and they are secured to the base 1 in any suitable means as by bolts, rivets or welding.

Supported intermediately of the side plates 4 is a housing 13 which carries a prime mover 14 and a shaft 15. Energization of the prime mover 14 will, through gearing, not shown, result in a rotation of the shaft 15 in a selected direction. The shaft 15 extends through the side plates 4 on the opposite sides of the press. On the ends of the shaft 15, which thus project through the side plates 4, there are keyed drive pinions 16 for the purpose hereinafter more fully explained.

The base 1 is provided with trunnions 17 extending from opposite sides thereof. These trunions are arranged coaxially, and instead of being formed as separate trunnions extending from opposite sides of the base, a similar structure may be provided by mounting a shaft in the base which extends therethrough and projects from opposite sides thereof.

Rotatably supported on the opposite trunnions 17 are triangular shaped side arms 18. In order to facilitate tracing the lines bounding the side arms 18, it will be observed that such lines proceed from 19 to 20, to 21, and back to 19.

A generally U-shaped head 22, as most clearly illustrated in Fig. 2, is provided with trunnions 23 at opposite sides thereof, and here again a similar structure may be provided by having a shaft extend continuously through the head 22 and project on opposite sides therefrom. The side arms 18 are, at their upper corners, respectively rotatably mounted on the trunnions 23.

The legs 24 of the U-shaped member 22 are pivotally connected to trunnions 25 extending from opposite sides of the upper or movable press head 26 which carries the movable mold section 3. The upper press head 26 is provided with a rearwardly extending bracket 27, from the opposite sides of which extend stub shafts 28 which carry guide rollers for the purpose hereinafter more fully explained. The bracket 27 has a depending portion 29 which likewise carries stub shafts 30, the latter being provided with guide rollers for the purpose hereinafter more fully explained.

The inner faces, that is, the opposed faces of the triangular shaped side members 18, carry segmental racks 31. The center of curvature of the racks 31 is the axis of the trunnions or shaft 17. The gears 16 on opposite ends of the power shaft 15 mesh with the segmental racks 31 on the side members 18 on opposite sides of the press, and in this manner actuation of the member 18 is effected and by which, through the head member 22, the upper head 26 and its associated movable mold are moved toward and away from the stationary mold 2 during closing and opening movement respectively of the press.

All of the foregoing description pertains to apparatus disclosed in my aforesaid prior applications and forms no part of the present invention. The present invention is concerned with the means for guiding the path of movement of the upper head 3 during its said movement toward and away from the stationary mold section. This guiding of the movement of the upper mold section is effected by auxiliary side plates on opposite sides of the machine which are movably supported on the opposed inner faces of the side plates 4. Since these auxiliary side plates are on the inside of the machine, that is, movably supported on the inner faces of the stationary side plates 4, their illustration in the drawings is somewhat obscure. However, they merely consist of flat plates, the configuration of which may be readily determined from Fig. 3 as being bounded by the line drawn through the following points, viz: 32, 33, 34, 35, 36, 37, 38, 39 and back to 32.

Each of these auxiliary side plates is provided with two sets of cam slots; one set, which includes the slots 40 and 41, and by which the auxiliary side plate is movably guided on the stationary side plates 4, and the second set which includes slots 42 and 43 by which the auxiliary side plate guides the path of movement of the upper press head 3.

Stub shafts 44 and 45 are carried by each of the stationary side plates 4, and such stub shafts, with rollers thereon, are respectively positioned in the slots 40 and 41.

The stub shafts 28 and 30, with their guide rollers thereon, extend into the slots 43 and 42 respectively.

It will be observed that the two spaced guide shafts 28 and 30 having engagement with the auxiliary side plate in the cam slots 43 and 42 respectively will be effective to guide the opening and closing movement of the movable mold section 3 as it is moved by actuation of the apparatus hereinbefore described, which includes the head 22 and the side plates 18.

This invention relates particularly to the type of vulcanizer press in which the closing and opening movements, and particularly the latter, of the movable press head is such, relative to the stationary press head, that the movable press head exerts a so-called self-stripping action on the cured tire contained in the press, and during the opening movement of the press. This self-stripping action of the movable press head is effected by having the latter move away from the stationary press head for a distance sufficient to clear the register of the mating mold parts. Thereafter, the two mold parts are separated by a relative transverse shifting movement therebetween, which is effective to grip the tire in diametrically opposite areas respectively on opposite sides of its equatorial so that, as the press opens, the tire will be automatically stripped or peeled from each mold section. This transverse shifting movement of the press heads, during opening movement, is effected by the control which the auxiliary side plates exercise on the path of movement of the movable mold 3.

While a relative lateral shifting movement is thus desirable during opening of the press to effect a stripping of the tire in the manner described, it is nevertheless desirable and important that the press close in such a manner that in the latter stages of its closing movement, the mold sections approach each other by a relative rectilinear motion so that the molds may properly center about the green tire, and thus embrace the same without scuffing or deformation, so that upon subsequent inflation of the curing bag within the tire, the tire will be properly centered and be able to properly fill the mold cavity. In a press of this character it is, therefore, desirable to have the press open with the relative lateral shifting motion described, and to close with relative rectilinear motion between the mold sections. The cam slots 42 and 43 are so formed in the auxiliary side plates that when such auxiliary side plates are maintained in a predetermined position, the cam slots acting through the stub shafts 28 and 30 will cause the press to close in the described fashion with relative rectilinear closing movement in the last stages. In other words, as the press is moved to its closed position from the open position illustrated in Fig. 3, the upper mold section is first moved into a position parallel with the lower mold section. This is effected by a riding forward in the cam slot 43 of the stub shaft and its follower 28. Thereafter, the substantial vertical direction of the lower ends of the cam slots 42 and 43 is effective to guide the mold section 3 vertically downwardly into engagement with the stationary mold section 2. Now if the auxiliary side plates or guiding plates were held stationary during opening movement of the press, the path just described would be followed in reverse order. However, such path would not provide the self-stripping motion desirably imparted to the upper mold section 3.

The necessary modification of the path of travel of the mold section 3 in its opening movement is effected by a shifting of the guiding auxiliary side plates during the opening movement of the press. This shifting motion is accomplished by the means which will now be described.

Secured to the opposed inner faces of the triangular side members 18 are cam elements 46. These cam elements are pivotally secured to the side members 18 at one point by stub shafts 47. The other ends of the cam members 46, as most clearly illustrated in Fig. 4, are guided for arcuate movement by lugs 48 likewise secured to the inner faces of the side members 18 and having engagement with the cam elements 46 in the slots 49 provided therefor. As most clearly illustrated in Fig. 6, an angle-shaped bracket 50 is secured to the inner face of each of the side members 18 near its bottom pivot point on the trunnion 17. Pivotally supported on the bracket 50 is an upwardly extending rod 51 which is in axial alignment with a rod 52 which is pivotally secured at 53' to a tab on the cam member 46.

A spring 53 is mounted on the rods 51 and 52. Such spring is normally under compression urging the cam member 46 in a clockwise direction about its pivot point 47 as viewed in Fig. 6. A stop pin 54 likewise mounted on the inner face of the side member 18 limits the extent of the clockwise movement which may be imparted to the cam member 46 by the spring 53.

Since there is a substantial space between the ends of the rods 51 and 52, the cam member 46 may be moved in a counterclockwise direction about its pivotal support 47, as viewed in Fig. 6, such movement being, however, opposed by the spring 53, and being guided by member 48 having engagement in the slot 49.

The cam member 46 includes on its inwardly directed face, a flange which follows the line through the following points: 55, 56, 57, 58, 59, 60. Substantially centrally in the space encompassed by the cam flange just described is an abutment 61 to which are pivotally secured gate members 62 and 63. Springs 64 and 65 normally maintain these gate members in the position illustrated in Fig. 6.

The side plates 4 are provided with elongated openings 66. Stub shafts 67 mounted on the auxiliary side plates in which are formed the cam slots previously described, extend through these openings 66 into the space encompassed by the cam flange on the cam member 46.

Now by having reference to Fig. 6, it will be observed that when the side members 18 are rotated in a clockwise direction, the stub shaft 67, with its roller follower thereon, will move from the right-hand end of the cam slot in the member 46 to the left-hand end thereof. The gate 62 will cause the shaft 67 to ride upwardly thereover, and since the shaft 67 is attached to the auxiliary side plates, the latter will be forced rearwardly and upwardly as viewed in Fig. 6 in a direction determined by the cam slots 40 and 41. Now when the roller 67 passes the abutment 61, it will depress the gate 63 against the action of its spring 65, and the auxiliary side plate will move downwardly and to the left, as viewed in Fig. 6, until the roller 67 occupies a position at the extreme left end of the cam slot at 58, whereupon the auxiliary side plates will be restored to their initial position. The clockwise pivotal movement of the side member 18 resulting in a displacement of the auxiliary side plates in the manner just described occurs, of course, during opening movement of the press, and the displacement of the auxiliary side plates in the manner described, causing a displacement in the cam slots carried thereby, which guide the opening movement of the movable mold head 3, will cause the latter to follow the transverse shifting path previously described which results in a self-stripping of the cured tire from the press.

Now when it is desired to close the press by relative rectilinear movement by the mold sections during the last stages of the closing movement in the manner previously described, the side arm members 18 will be moved in a counterclockwise direction about their axis of the pivotal support at 17 causing the roller 67 to move from the left-hand end of the cam slot in the member 46 (as illustrated in Fig. 3) downwardly and to the right in such cam slot. During the opening movement previously described, the roller has passed into the left-hand end of the cam slot in the member 46 for a distance sufficient to permit the spring 67 to return the gate 63 to the position illustrated in Figs. 3 and 6. Then, when the side member 18 is rotated in a counter-clockwise direction, causing the roller 67 to move to the right in the cam slot, it will move under the gate 63 and follow a path which is a segment of a circle, the center of which is at the axis of the shaft 17, so that during the closing movement of the press there is no disturbance of the position of the auxiliary side plates, and the press is accordingly permitted to close by relative rectilinear motion during its latter stages in the manner previously described.

From the foregoing description, it will be observed that the shifting of the auxiliary side plate during the opening movement of the press is the means by which the path of opening movement of the mold section 3 is modified so as to grip the tire in the manner previously described and strip it from the press. As likewise previously indicated, different tires, that is, tires having different sizes and/or different tread designs, require a different degree of transverse shifting movement between the mold sections during opening movement of the press in order to properly strip the tires from the press. It is, therefore, necessary and desirable that there be provided some means for adjustably controlling the degree of this displacement of the auxiliary side plate, and consequently the degree of lateral shifting or stripping motion of the movable press head.

This is accomplished by pivotally supporting the cam member 46 and by providing an adjustable limiting stop for the auxiliary side plate. This adjustable limiting stop is most clearly illustrated in Fig. 5 wherein it is shown that the stub shaft 45 mounted on the stationary side plate 4, and which carried a roller follower operating in the cam slot 41 to guide the movement of the auxiliary side plate with respect to the stationary side plate 4, has an extension 68 thereon provided with a threaded opening in which is received the adjusting screw 69. Secured to the auxiliary side plate 70 adjacent the cam slot 41 is a stop bracket 72 with which the end of the screw 69 may have engagement as the auxiliary side plate 70 is moved upwardly and to the rear upon clockwise rotation of the side plates 18 in the manner previously described. In Fig. 5 a fragmentary portion of the side members 18 is shown to indicate somewhat more fully the lateral spacing between the three side plates, it being observed that the space between the side member 18 and the stationary side plate 4 is sufficient to accommodate the cam member 46.

From the foregoing, it will be observed that if the screw 69 is fully retracted, that is, moved to the right to the full extent of its adjustment as illustrated in Fig. 5, the amount of displacement of the auxiliary side plate during opening movement of the press is determined by the throw which the cam member 46 exerts on the shaft 67. The parts will be so constructed that this amount of throw will be sufficient for all extreme cases of lateral shifting necessary between the mold parts during their opening movement in stripping the tire from the mold parts. Lesser amounts of such displacement and consequently lesser amounts of such lateral shifting motion are secured by moving the adjusting screw 69 to the left as viewed in Fig. 5 so that the screw engages the stop 72 before the roller 67 has moved up to the top of the incline provided by the gate 62. When the stop 72 strikes the end of the screw 69, the roller 67 must, of course, continue upwardly in its path of travel over the gate 62 and onto the abutment 61, and this is permitted without damage to the parts by the resiliently opposed counter-clockwise rotation permitted by the cam member 46 under the influence of the spring 53.

From the foregoing, it will be observed that I have provided an improved press which is characterized not only by the fact that the mold parts during relative opening movement are shifted transversely in order to effect a self-stripping of the tire from the mold parts in the manner described, but also by the fact that the degree of such shifting motion may be readily adjusted so that the press may be actuated for best operation on particular tires which it may be called upon to cure.

It will be observed that by virtue of the utilization of my auxiliary side plate 79 in which are formed the cam slots guiding the path of movement of the movable mold element, and due to the fact that the shifting of such auxiliary side plate is accomplished by another cam, the slope of which may likewise be changed, and the fact that the adjustable stop may be variously positioned, enables one to secure, within limits, almost any desired motion of the movable mold section with an adjustable control over the degree of such motion.

At this point it should be noted that while the foregoing invention has been defined as preferably utilizing auxiliary side plates on opposite sides of the machine, it will be found that for the smaller size machines only one controlling auxiliary side plate will generally be sufficient. In the larger size presses, however, and in particular presses in which two or more pairs of mold sections are actuated by the same mechanism, that is, in the so-called twin presses for example, the provision of the auxiliary guiding side plates on both sides of the press will generally be found necessary. The cam slots of the several series which are respectively relied upon for the purpose of guiding and controlling the movement of the various parts of the press have been, in the illustrated embodiment of the invention, illustrated as formed in substantially the identical manner as the cams of the press of my co-pending application, Serial No. 245,726.

Reference may, therefore, be had to Figs. 11 to 17 of the drawings of said last-named application for an illustration of the relative positions of the mold parts at various stages of the opening and closing movement. Particular attention is directed to the fact that the displacement of the auxiliary side plate during the opening movement of the press may be effective to cause the front edge of the upper mold section to be tilted downwardly, that is, the parting plane of the upper mold section may be inclined with respect to the plane of the lower mold section during the early stages of the opening movement to facilitate a more uniform and effective grip on the tire to be stripped during the ensuing opening movement of the press.

Other modes of applying the principle of the invention may be employed, change being made as regards the details described, provided the features stated in any of the following claims or the equivalent of such be employed.

I, therefore, particularly point out and distinctly claim as my invention:

1. In a vulcanizing press for pneumatic tires including a pair of cooperating mold parts; means for tilting one of such mold parts in respect to the other, which means include a movably supported plate provided with a cam guide in operative engagement with a cam carried on the mold part to be tilted, and a toggle member pivotally mounted at a point below the mold parts and operatively connected with the mold part to be tilted; and means associated with the first named means and operative to move one of such mold parts laterally relative to the other mold part while a tire in the press is in the path of lateral movement of such movable mold part, which last named means includes an element carried by such toggle member and provided with cam guides in engagement with a cam operatively connected with the plate in the first recited means, whereby such plate is shifted laterally during initial opening movement of the movable mold part; the improvement comprising adjustable means mounted in fixed relation on such press and operative to restrict movement of the movable plate in the first recited means, and a mounting, pivotally supporting such cam guides on such toggle member and resiliently urging the element toward said adjustable restraining means.

2. In a vulcanzing press for pneumatic tires, a pair of cooperating mold parts; means for tilting one of said mold parts in respect to the other part, which means include a plate element mounted movably relative to a fixed portion of the press and provided with a cam guide slot in engagement with a cam operatively connected with the tiltable mold part, a toggle member mounted pivotally at a point below said mold parts and operatively connected with the tiltable mold part, and means operative to actuate said toggle member; means associated with said first named means and operative to move one of said mold parts laterally relative to the other mold part while a tire in the press is in the path of lateral movement of such movable mold part, which last named means includes a screw mounted in fixed relation on the press and adjustable to operatively restrict movement of said movable plate in said first means, and an element, pivotally mounted on said toggle member and provided with cam guides in engagement with a cam operatively connected to said movable plate in said first recited means, which cam guides so control movement of the engaged cam as to effect a lateral shift of said movable plate following initial movement of the movable mold part when opening the press, and a spring resiliently urging said element toward said screw.

3. The combination with a movable head in a press; means for actuating said head; guiding means for said head comprising a stationary member, a guide member movably supported on said stationary member and movable relative to said press head, means interconnecting said movable guiding member and said movable press head determining a fixed path of relative movement therebetween, means functionally responsive to the movement of said actuating means for shifitng by an adjustable distance the relative positions of said stationary member and said movable guide member to shift bodily the said path relative to said stationary member, and means for adjustably controlling the amount of said shift.

JAMES W. BRUNDAGE.